United States Patent
Hurley et al.

(10) Patent No.: US 8,433,275 B2
(45) Date of Patent: Apr. 30, 2013

(54) SYSTEM AND METHOD FOR DC CORRECTION IN WIRELESS RECEIVERS

(75) Inventors: William M. Hurley, Murphy, TX (US); Lup Meng Loh, Plano, TX (US); Yinong Ding, Plano, TX (US); WeonKi Yoon, Richardson, TX (US); Michael L. Brobston, Allen, TX (US); John Alexander Interrante, Richardson, TX (US); Jordan Charles Mott, Allen, TX (US)

(73) Assignee: Samsung Electronics Co., Ltd, Suwon-Si (KR)

( * ) Notice: Subject to any disclaimer, the term of this patent is extended or adjusted under 35 U.S.C. 154(b) by 914 days.

(21) Appl. No.: 11/549,256

(22) Filed: Oct. 13, 2006

(65) Prior Publication Data
US 2008/0090541 A1    Apr. 17, 2008

(51) Int. Cl.
*H04B 1/10* (2006.01)

(52) U.S. Cl.
USPC .......................................... 455/307; 455/296

(58) Field of Classification Search .................. 455/366, 455/307, 296, 334
See application file for complete search history.

(56) References Cited

U.S. PATENT DOCUMENTS

| | | | | |
|---|---|---|---|---|
| 3,312,783 A * | 4/1967 | Martin et al. | ............ | 340/825.77 |
| 4,001,695 A * | 1/1977 | Hrbacek et al. | ............ | 455/226.4 |
| 4,296,318 A * | 10/1981 | Mezzetti et al. | ............... | 374/161 |
| 4,494,067 A * | 1/1985 | Barszczewski | ............ | 324/76.48 |
| 6,169,447 B1 * | 1/2001 | Tolson | ......................... | 327/557 |
| 6,882,662 B2 * | 4/2005 | Subrahmanyan et al. | ..... | 375/372 |
| 6,985,711 B2 * | 1/2006 | Holenstein et al. | ........... | 455/266 |
| 2003/0203727 A1 * | 10/2003 | Kluge et al. | ................. | 455/234.1 |
| 2004/0090277 A1 * | 5/2004 | Tsyrganovich | .................. | 331/74 |
| 2004/0097212 A1 * | 5/2004 | Matsumoto et al. | .......... | 455/296 |
| 2004/0176055 A1 * | 9/2004 | Vepsalainen et al. | ......... | 455/130 |
| 2005/0156599 A1 * | 7/2005 | Panzer | ......................... | 455/307 |
| 2007/0086547 A1 * | 4/2007 | Sobchak et al. | ............... | 375/345 |

* cited by examiner

*Primary Examiner* — Lana N Le

(57) ABSTRACT

A system and method for minimizing a DC component of a received signal are disclosed. As one example, a system for minimizing a DC component of a signal in a wireless receiver is disclosed, which includes a programmable filter operable to filter the signal with at least one of a low cutoff frequency and a high cutoff frequency, and a transition unit coupled to the programmable filter, the transition unit operable to transition the programmable filter between the high cutoff frequency and the low cutoff frequency.

21 Claims, 3 Drawing Sheets

SYSTEM AND METHOD FOR DC CORRECTION IN WIRELESS RECEIVERS

FIELD OF THE INVENTION

The invention is related to the wireless communication field, and particularly, but not exclusively, to a system and method for direct current (DC) correction in wireless receivers.

BACKGROUND OF THE INVENTION

Wireless communication devices include a receiver configured to receive and process an incoming signal. However, an unwanted DC component can frequently appear at various stages in a wireless receiver design. The DC component or offset may cause the receiver to operate inefficiently or, in extreme cases, may prevent the receiver from operating at all.

In order to avoid the typical problems caused by DC offset, a correction or cancellation process is generally used to remove the unwanted DC component while preserving the fidelity of the higher frequency components of the signal. Since an ideal filter (e.g., one that can remove the DC component while perfectly preserving the other frequency components) is impractical or even impossible to implement, existing receiver designs typically include a high pass filter having a fixed cutoff bandwidth (or frequency). The cutoff bandwidth (or frequency) may be selected as a compromise between various requirements, such as, for example, fast convergence of the correction of the initial DC offset upon activation of the receiver (requires a higher 3 dB bandwidth), preservation of the fidelity of the received signal during the receiver's operation (requires a lower 3 dB bandwidth), and the ability to track anticipated changes in the nature of the unwanted DC component throughout the receiver's operation (requires varying 3 dB bandwidths depending on the DC level changes involved). In one implementation of a Global System for Mobile Communications (GSM) receiver, for example, a 3 dB bandwidth of less than 5 KHz might be used during the capture of a burst, in order to preserve received signal fidelity. On the other hand, a 3 dB bandwidth of greater than 50 KHz might be used prior to the burst, in order to rapidly cancel a large amount of DC offset.

Receivers used in Time Division Duplex (TDD) systems have to be able to cancel DC signal components rapidly, in order to meet system timing requirements while also preserving signal integrity. For example, in order to meet certain system specifications, a TDD receiver must be able to turn on and cancel DC components within a relatively small window of 10s of microseconds between receive slots. Consequently, the receiver must be designed to function very aggressively to remove the DC components initially, but the receiver's design must also allow for good signal fidelity during the receive slot. For example, if the bandwidth of the DC correction filter is maintained continually at the low cutoff frequency, then the convergence time of the initial DC offset would require 10 times more than that of a high cutoff filter (on the order of 100s of microseconds), which exceeds the allowable time. Also, maintaining a DC offset removal filter with a high cutoff frequency while an active slot is being received, would degrade the signal quality to the extent that demodulation would not occur.

Nevertheless, balancing the various system requirements is difficult because some of the requirements conflict with others. For example, relatively large fluctuations in DC levels generally require a high cutoff frequency response, but this requirement is at odds with the need to preserve the fidelity of the received signal. Also, this requirement is impossible to achieve with a fixed bandwidth high pass filter. Furthermore, such traditional, non-adaptive approaches do not effectively exploit those systems that can dynamically transition between TDD and Frequency Division Duplex (FDD) operations, such as Wideband Code Division Multiple Access (WCDMA) FDD and compressed mode operation systems.

SUMMARY OF THE INVENTION

A system and method for minimizing a DC component of a received signal are provided. In one example embodiment, a system for minimizing a DC component of a signal in a wireless receiver is provided, which includes a programmable filter operable to filter the signal with at least one of a low cutoff frequency and a high cutoff frequency, and a transition unit coupled to the programmable filter, the transition unit operable to transition the programmable filter between the low cutoff frequency and the high cutoff frequency.

In a second example embodiment, a system for minimizing a DC component of a signal in a wireless receiver is provided, which includes means for activating the receiver, means for filtering the signal in at least one of a low cutoff frequency mode and a high cutoff frequency mode, and means for transitioning the means for filtering from the high cutoff frequency mode to the low cutoff frequency mode after the receiver is activated and prior to receipt of an active burst.

In a third example embodiment, a method for minimizing a DC component of a signal in a wireless receiver is provided, which includes the steps of activating the receiver, high pass filtering the signal, and transitioning the high pass filtering of the signal from a high cutoff frequency to a low cutoff frequency prior to receipt of an active burst.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Essentially, a dynamic DC offset correction approach is provided that is flexible and versatile enough to address all of the requirements typically imposed on TDD receiver designs, without suffering from the non-optimal performance that stems from the above-described compromises using a fixed bandwidth high pass filter technique. The present invention's dynamic DC offset correction approach provides the unique ability for a receiver to achieve fast convergence for the initial DC offsets that appear immediately after receiver activation, track small changes to the DC offsets during the receiver's operation, and also preserve the fidelity of the remainder of the received signal (non-DC components).

Figure 1:
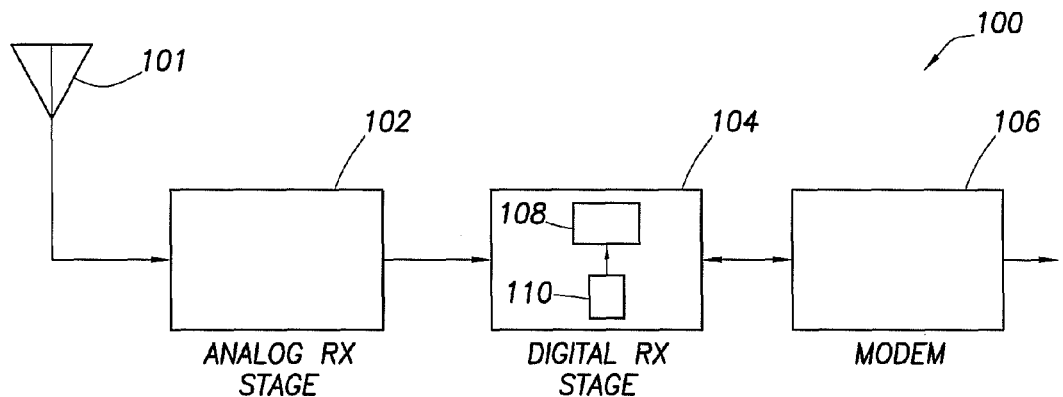
FIG. 1 depicts a simplified block diagram of an example receiver, which can be used to implement an embodiment of the present invention.

With reference now to the figures, FIG. 1 depicts a simplified block diagram of an example receiver 100, which can be used to implement an embodiment of the present invention. For this illustrative embodiment, receiver 100 includes pertinent receiver components for a wireless or mobile TDD transceiver. Note that other components of such a transceiver (e.g., transmitter, memory, host controller/processor, etc.) are known and may vary depending on the particular implementation of the wireless/mobile transceiver involved. Therefore, these other components are not described further herein.

Receiver 100 includes an analog receive stage (or section) 102, which receives an incoming signal from an antenna 101. For example, analog receive stage 102 may include such front-end components as an RF signal detector, RF signal amplifier, and various other analog devices used for processing an incoming signal. The signal output from the analog receive stage 102 is coupled to a digital receive stage 104, which includes (among other components) a programmable filter 108 and a state machine 110. Responsive to filter bandwidth parameters output from the state machine 110, the programmable filter 108 filters the incoming signal based on the filter's parameters (e.g., the filter's cutoff values), and passes the filtered signal on to another receiver stage 106 (e.g., a modem).

For this example embodiment, modem 106 is a digital baseband modem that controls the demodulation of signals within receiver 100. As such, modem 106 is sensitive to DC offset. Consequently, a desirable characteristic of the receiver section within which programmable filter 108 is located is to minimize or eliminate any DC components from the received signal prior to passing the signal to modem 106, and also maintain the fidelity of the received signal. In any event, it should be understood that other components (not shown) of receiver 100 may be located between programmable filter 108 and antenna 101, and also between programmable filter 108 and modem 106. Also, for this example embodiment, programmable filter 108 may be implemented with a first order Infinite Impulse Response (IIR) high pass filter. However, the present invention is not intended to be so limited, and other embodiments may be implemented with other types of filters or similar functions, such as higher order IIR filters, other non-linear filtering devices, or low pass and bypass filter approaches.

Figure 2:
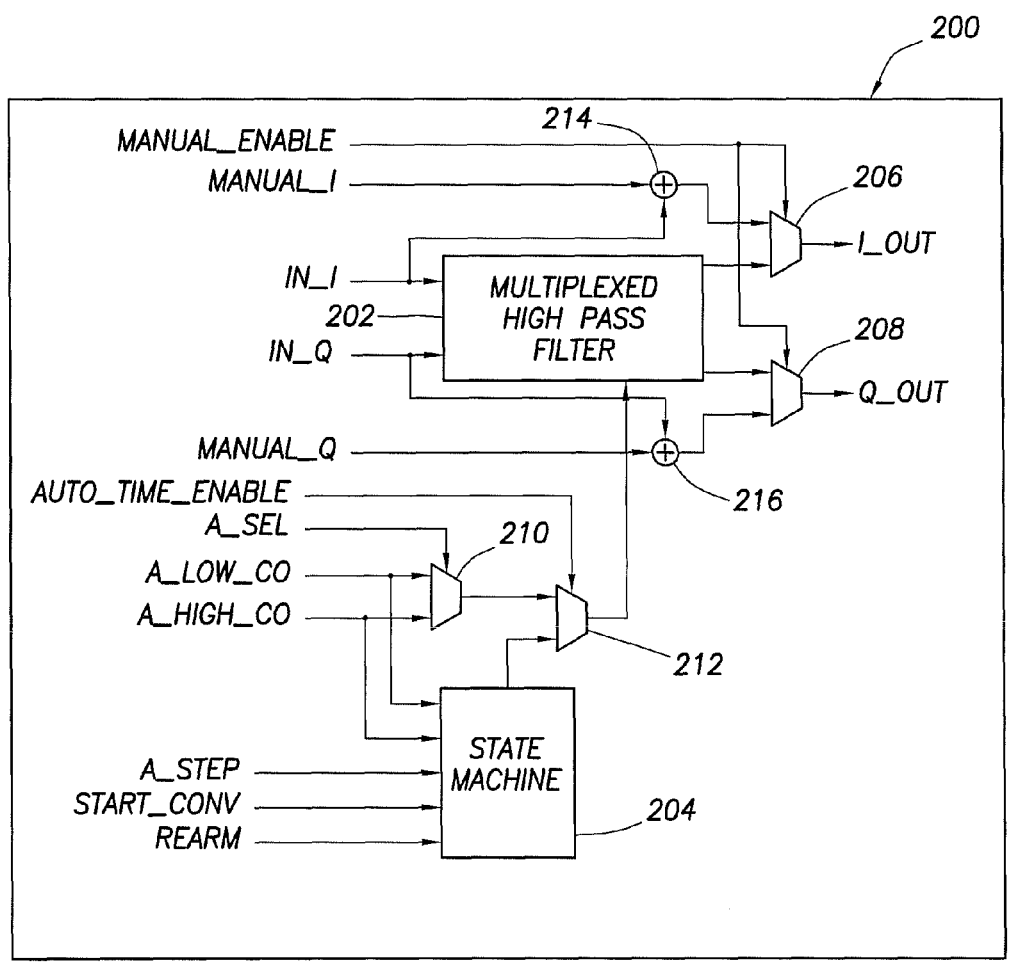
FIG. 2 depicts a schematic block diagram of a circuit that may be used to minimize or eliminate DC components in a signal received by a wireless TDD receiver, in accordance with an example embodiment of the present invention.

FIG. 2 depicts a schematic block diagram of a circuit 200 that may be used to minimize or eliminate DC components in a signal received by a wireless TDD receiver, in accordance with an example embodiment of the present invention. For example, circuit 200 may be used to implement the signal filtering components of digital receive stage 104 in wireless receiver 100 shown in FIG. 1.

Circuit 200 includes a filter 202 having a plurality of programmable cutoff frequencies, and a state machine 204 coupled to filter 202. For this example embodiment, filter 202 may be implemented with a multiplexed, two channel, first order IIR high pass filter. However, the present invention is not intended to be so limited, and other embodiments may be implemented with other types of filters or similarly functioning devices or techniques. In this example configuration, one channel of filter 202 provides a path for an in-phase signal, and the second channel provides a path for a corresponding quadrature signal. State machine 204 provides coefficients for filter 202 that control the cutoff frequency (e.g., notch width) parameters of filter 202. Circuit 200 also includes various other components 206, 208, 210, 212, 214 and 216 coupled to filter 202 and/or state machine 204, such as registers or adders that may be used to set one or more constant parameters, and multiplexers that may be used to switch the signal paths as desired.

The received signal input to circuit 200 includes an in-phase data stream portion and a quadrature data stream portion. The IN_I and IN_Q inputs couple the in-phase and quadrature data stream portions, respectively, to filter 202. The filtered in-phase and quadrature data streams are provided at outputs I_OUT and Q_OUT, respectively, via multiplexers 206 and 208. Notably, as a design option, circuit 200 may accept manual DC offset correction commands and bypass filter 202. For example, such manual corrections may be used if external DC offset measurement facilities are available that would yield improved performance for the overall receiver.

The (optional) manual DC offset correction mode may be enabled by inputting a suitable control signal at the MANUAL_ENABLE input. When the manual DC offset correction mode is enabled, a programmable constant value MANUAL_I is added to the in-phase data stream at input IN_I by an adder 214, and the resulting signal is provided at the output I_OUT via multiplexer 206. Also, a second programmable constant value MANUAL_Q is added to the quadrature data stream at input IN_Q by a second adder 216, and the resulting signal is provided at the output Q_OUT via multiplexer 208. For example, each constant value at the MANUAL_I and MANUAL_Q inputs may be the digital equivalent of a few microvolts to a few millivolts. At this point, it is important to note that the ability to measure the DC levels externally, and manually correct for DC offset with the constant values MANUAL_I and MANUAL_Q, may not be required in all cases. Thus, for those applications where this level of design flexibility is not required, the components of circuit 200 that provide the manual DC correction capability may be omitted.

In operation, for this example embodiment, circuit 200 accomplishes fast convergence of the initial DC offset (e.g., DC component of the signal input from analog receive stage 102 upon activation of the receiver) by providing high cutoff, fast convergence filtering prior to receipt of an active TDD burst. In order to provide an appropriate cutoff frequency (e.g., notch width), the high cutoff frequency for filter 202 is controlled by the programmable constant value provided at the A_HIGH_CO input, and the low cutoff frequency for filter 202 is controlled by the programmable constant value provided at the A_LOW_CO input. Just prior to an active burst, the receiver's baseband modem (e.g., modem 106) initiates a ramping sequence (for filter 202) in state machine 204, by providing a precisely controlled write instruction at the START_CONV input. It is important that filter 202 should remain in the high cutoff frequency mode (e.g., wide notch) for a long enough period so that by the time the write command at START_CONV is input, DC component removal is sufficient such that the filter 202 can be transitioned to a low cutoff frequency (e.g., narrow notch), high signal fidelity mode of operation, and the TDD burst can begin with a residual DC level within specifications of modem 106. However, an abrupt change to the filter's cutoff frequency, such as, for example, all abrupt step that might occur between the high cutoff frequency (A_HIGH_CO) and the low cutoff frequency (A_LOW_CO), can cause undesired signal effects, such as the introduction of an artificial DC component. However, inducing such a DC component after filter convergence defeats the purpose of the DC removal process. Therefore, after convergence, the filter coefficients (and thus the cutoff frequency) generated by state machine 204 are smoothly swept between the high cutoff frequency (determined by the A_HIGH_CO value) and the low cutoff frequency (determined by the A_LOW_CO value) at a rate defined by the value provided at the A_STEP input. With knowledge of the ramping rate, the baseband modem 106 can initiate a ramping function in state machine 204, which provides suitable coefficients (via multiplexer 212) such that filter 202 operates with a low cutoff frequency (A_LOW_CO), and the DC component in the received signal is removed just prior to the active burst. As such, it may be assumed that the slower the ramping rate, the less DC will be induced into the received signal by filter parameter changes. For example, given the DC levels typically present in GSM receivers, a ramp time of 15 microseconds can be used to transition the high pass filter between its high and low cutoff states without introducing enough DC to violate the typical baseband modem specifications.

During an active burst, the low cutoff frequency mode of programmable filter 202 provides suitable receive signal fidelity. Additionally, after filter 202 has reduced the initial DC component in the receive signal to an acceptable level, and the receiver is in operation, circuit 200 is able to adapt to changing DC offset values. For example, the amount of DC present in the received signal varies at different points in the receiver chain and is caused by two distinct mechanisms. One mechanism causes small changes in the DC offset and results from routinely occurring variations in temperature and bias voltage, as well as a changing RF environment. The second mechanism causes relatively large changes in the DC offset and results from a deliberate change in the receiver's gain by the host controller of the receiver involved. In a typical TDD system, the receiver's gain is held constant during the active burst and, thus, does not contribute to the introduction of unwanted DC components. As such, circuit 200 is capable of automatically tracking and correcting for the small changes in DC offset that routinely occur due to the variations in temperature and bias voltage caused by the high pass filter operating in a low bandwidth mode.

After an active burst is complete, the receiver is typically shut off in order to minimize power consumption. At restart, and in preparation for the next active burst, the DC offset once again needs to be removed. Consequently, for this example embodiment, after the active burst is complete, the baseband modem inputs a suitable command signal at the REARM input of state machine 204, in order to cause filter 202 to initialize to a high cutoff frequency (A_HIGH_CO) in preparation for the next active slot.

For this example embodiment, circuit 200 provides a significant amount of flexibility by enabling the receiver's host controller to control the bandwidth of high pass filter 202 with suitable signals at the AUTO_TIME_ENABLE and A_SEL inputs of multiplexers 212 and 210, respectively. For example, if adequate facilities exist external to circuit 200, which can be used to switch the bandwidth of the high pass filter in such a way that is preferred over the above-described ramping technique, the receiver's host controller can remove or de-assert the signal at the AUTO_TIME_ENABLE input, and manually select between one of two cutoff frequency values defined by the signals at inputs A_LOW_CO and A_HIGH_CO with timing that is independent of any constraints that may be otherwise imposed on circuit 200. Essentially, the cutoff frequency of the high pass filter can be manipulated in a complex manner and set to any number of different bandwidths over a period of time, by providing suitable signals at inputs A_LOW_CO, A_HIGH_CO, and A_SEL. In one example embodiment, this complex filter control capability may be realized in software executed on the host controller/processor of the receiver involved.

Figure 3A:
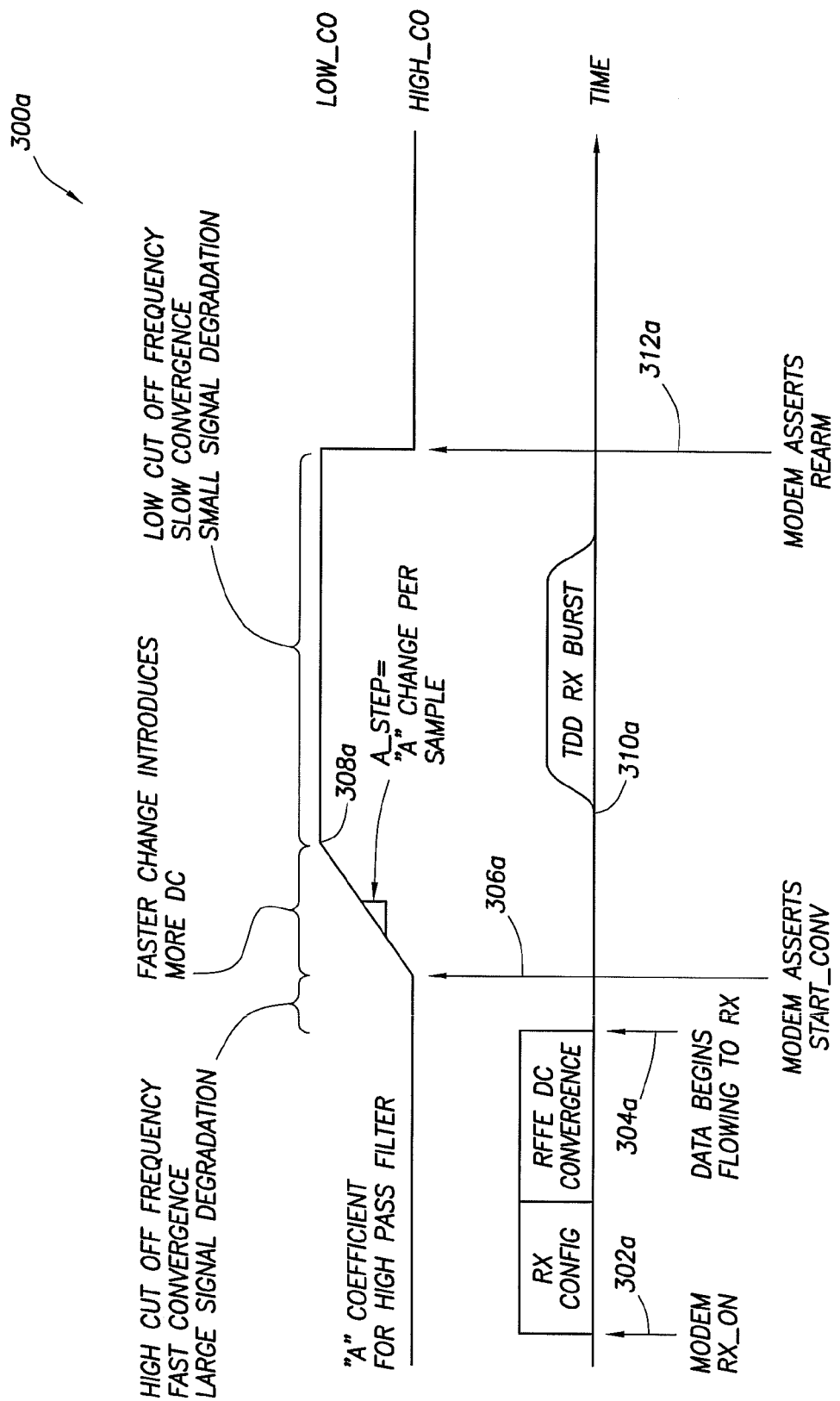
FIGS. 3A and 3B are related time sequence diagrams that depict a method that may be used to minimize or eliminate DC components or offset in a signal received by a wireless TDD receiver, in accordance with an example embodiment of the present invention.
Figure 3B:
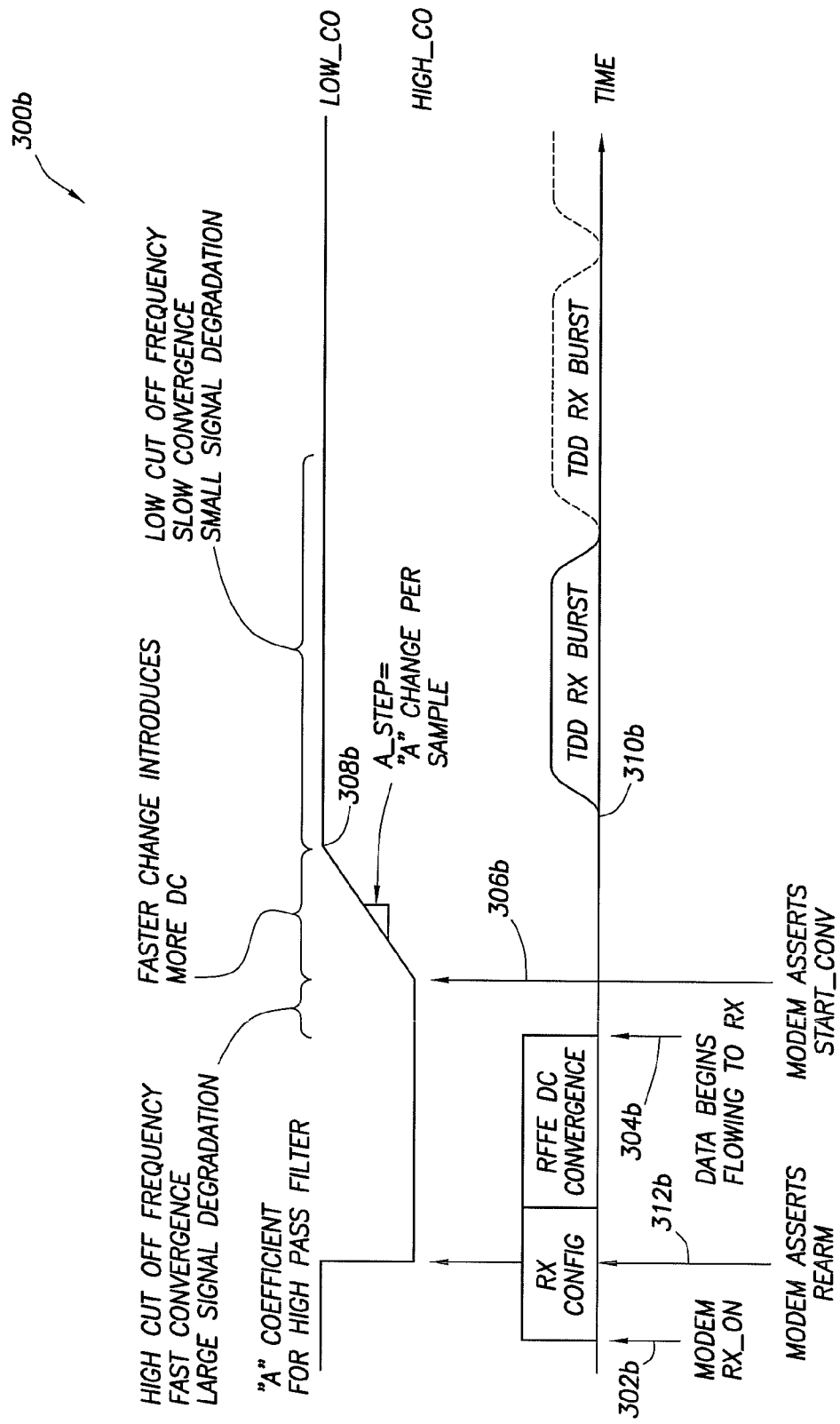

FIGS. 3A and 3B are related time sequence diagrams that depict a method 300 that may be used to minimize or eliminate a DC component (offset) in a signal received by a wireless TDD receiver, in accordance with an example embodiment of the present invention. For example, method 300 shown in FIGS. 3A and 3B may be used in conjunction with circuit 200 in FIG. 2 to minimize or eliminate DC offset in a wireless TDD receiver, such as receiver 100 shown in FIG. 1. However, it should be understood that the present invention is not intended to be limited only to receiver 100 and equivalent receiver designs, and method 300 may be used to minimize or eliminate DC offset in a signal received by any wireless receiver or other receiver having a similar architecture or design.

Referring now to method 300a shown in the example embodiment of FIG. 3A, the receiver's modem (e.g., modem 106, responsive to the receiver's host controller) initiates the receive configuration process (step 302a), which enables the receiver to begin receiving an incoming signal. For example, modem 106 may send a suitable control message (e.g., RX_ON) to digital receive stage 104 to initiate the receive configuration process. Note, at this point, that the "A" coefficient (e.g., provided by the state machine 204) provides a high cutoff frequency (e.g., determined by the signal input at A_HIGH_CO) for the high pass filter (e.g., filter 202). As part of the receive configuration process, the receiver begins the RF front-end configuration and DC convergence process.

Next, the received signal data begins flowing to the digital receive stage involved (step 304a). Note, at this point, the high pass filter is set with a high cutoff frequency value (e.g., wide notch), the DC offset correction section of the receiver (e.g., circuit 200 in this example embodiment) is performing fast convergence of the initial DC offset, and a relatively large amount of signal degradation is occurring as a result. The receiver's modem 106 then asserts a suitable control signal at the START_CONV input of state machine 204 (step 306a). In response, the state machine 204 initiates a ramping function, which provides a suitable set of coefficients (via multiplexer 212) such that filter 202 smoothly transitions from the high cutoff frequency value (HIGH_CO) to a low cutoff frequency value (LOW_CO), and the DC component in the received signal is reduced to an acceptable level prior to the active burst.

Note that the slower the ramping rate selected (e.g., determined by the signal at input A_STEP), the less DC component will be induced into the received signal by the filter parameter change. For example, given the DC levels typically present in GSM receivers and the guard-times typically used (e.g., 30 microseconds), a total ramp time of about 15 microseconds can be used to transition the high pass filter between its high and low cutoff bandwidth states without introducing a significant amount of DC offset. As such, the high pass filter 202 transitions to the low cutoff frequency value (step 308a), the DC offset correction section of the receiver is now performing slow convergence of any remaining DC offset, and a relatively small amount of signal degradation is occurring as a result.

Next, the receiver receives an active burst (step 310a). Note, at this point, that the high pass filter 202 has transitioned to the (narrow notch) low cutoff frequency value (LOW_CO) just prior to the active burst. Consequently, the DC component of the signal is minimized or eliminated when the receiver is activated, small changes to the DC offsets can be tracked and minimized during the receiver's operation, and the fidelity of the remainder of the received signal (the non-DC components) can be preserved.

After an active burst is complete, the receiver can be turned off in order to minimize power consumption. However, when the receiver is restarted, in preparation for the next active burst, the DC offset again needs to be removed from the signal. Consequently, the modem inputs a suitable command at the REARM input of state machine 204, in order to cause filter 202 to initialize to a high cutoff frequency (A_HIGH_CO) in preparation for the next active slot (step 312a).

The method 300a depicted in FIG. 3A shows the modem asserting the REARM control signal immediately after one active burst. Referring now to method 300b shown in the example embodiment of FIG. 3B, in this case, the receiver's modem (e.g., modem 106) asserts a REARM control signal in order to restart the DC offset correction process just prior to an active burst. For example, in FIG. 3B, note that the modem initiates the receive configuration process (step 302b) and then asserts the REARM control signal (step 312b) while the receiver is being configured. At this point, the high pass filter immediately transitions from the low cutoff frequency value (LOW_CO) to the high cutoff frequency value (HIGH_CO). The receiver then begins the RF front-end DC convergence process.

Next, the received signal data begins flowing to the digital receive stage involved (step 304b). Note that the high pass filter is now set with the high cutoff frequency value. The modem then asserts a suitable control signal at the START_CONV input of state machine 204 (step 306b). In response, the state machine 204 initiates the ramping function, which causes filter 202 to smoothly transition from the high cutoff frequency value (wide notch) to a (narrow notch) low cutoff frequency value (step 308b), and the DC component in the received signal is again removed prior to the onset of the active burst (step 310b).

The description of the present invention has been presented for purposes of illustration and description, and is not intended to be exhaustive or limited to the invention in the form disclosed. Many modifications and variations will be apparent to those of ordinary skill in the art. These embodiments were chosen and described in order to best explain the principles of the invention, the practical application, and to enable others of ordinary skill in the art to understand the invention for various embodiments with various modifications as are suited to the particular use contemplated.

What is claimed is:

1. A system for minimizing a DC component of a signal in a wireless receiver, comprising:
   a programmable filter operable to filter the signal with at least one of a low cutoff frequency and a high cutoff frequency; and
   a transition unit coupled to the programmable filter, the transition unit configured to execute a ramping function having a ramp time to smoothly transition the programmable filter between the high cutoff frequency and the low cutoff frequency prior to receiving an active burst, the ramp time defining a time period for the transition between the high cutoff frequency and the low cutoff frequency, wherein a DC component of the signal resulting from the transition is reduced by smoothly transitioning the high pass filter between the high cutoff frequency and the low cutoff frequency.

2. The system of claim 1, further comprising a set of inputs configured to allow a separate controller to control the programmable filter by bypassing the transition unit.

3. The system of claim 1, further comprising a set of inputs configured to allow a manual control for minimizing the DC component by bypassing the programmable filter.

4. The system of claim 1, wherein the transition unit comprises a state machine configured to receive a number of control signals from a modem and determine a filter coefficient that is sent to the programmable filter.

5. The system of claim 1, wherein the programmable filter comprises a high pass infinite impulse response filter.

6. The system of claim 1, wherein the wireless receiver is operable as a wireless TDD receiver.

7. The system of claim 1, wherein the transition unit is operable to transition the programmable filter from the high cutoff frequency to the low cutoff frequency in response to receiving a control signal prior to the active burst.

8. The system of claim 1, wherein the transition unit is operable to transition the programmable filter from the low cutoff frequency to the high cutoff frequency after at least one active burst.

9. The system of claim 1, wherein the transition unit is operable to transition the programmable filter from a fast convergence mode to a slow convergence mode prior to, an active burst.

10. The system of claim 1, wherein the transition unit is operable to transition the programmable filter from a low signal fidelity mode to a high signal fidelity mode prior to an active burst.

11. A system for minimizing a DC component of a signal in a wireless receiver, comprising:
    a baseband modem for activating the receiver;
    a multiplexed high pass filter for filtering the signal in at least one of a low cutoff frequency mode and a high cutoff frequency mode; and
    a control unit for executing a ramping function having a ramp time for smoothly transitioning the filter from the high cutoff frequency mode to the low cutoff frequency mode after the receiver is activated and prior to receipt of an active burst, the ramp time defining a time period for the transition between the high cutoff frequency mode and the low cutoff frequency mode, wherein a DC component of the signal resulting from the transition is reduced by smoothly transitioning the high pass filter between the high cutoff frequency mode and the low cutoff frequency mode.

12. The system of claim 11, wherein the baseband modem activates the receiver in response to a control signal from a host controller.

13. The system of claim 11, wherein the multiplexed high pass filter comprises a programmable high pass filter.

14. The system of claim 11, wherein the multiplexed high pass filter comprises a programmable high pass infinite impulse response filter.

15. The system of claim 11, further comprising a bypass control interface for allowing a separate controller to control the programmable filter by bypassing the transition unit.

16. The system of claim 11, further comprising a manual control interface for allowing a manual control for minimizing the DC component by bypassing the programmable filter.

17. The system of claim 11, wherein the control unit comprises a state machine configured to receive a number of control signals from a modem and output a linear plurality of filter coefficients.

18. A method for minimizing a DC component of a signal in a wireless receiver, comprising:
    activating the receiver;
    high pass filtering the signal; and
    executing a ramping function having a ramp time to smoothly transition the high pass filtering of the signal from a high cutoff frequency to a low cutoff frequency prior to receipt of an active burst, the ramp time defining a time period for the transition between the high cutoff frequency and the low cutoff frequency, wherein a DC component of the signal resulting from the transition is reduced by smoothly transitioning the high pass filter between the high cutoff frequency and the low cutoff frequency.

19. The method of claim 18, further comprising transitioning the high pass filtering of the signal from the low cutoff frequency to the high cutoff frequency after the active burst.

20. The method of claim 18, wherein the high pass filtering is performed by a programmable high pass infinite impulse response filter.

21. The method of claim 18, wherein the ramping function is executed by a state machine configured to receive a number of control signals from a modem and determine a filter coefficient that is sent to the programmable filter.

* * * * *